US012786689B2

(12) United States Patent
Mikuni et al.

(10) Patent No.: US 12,786,689 B2
(45) Date of Patent: Nov. 3, 2026

(54) APPARATUS AND METHOD FOR DIAGNOSING CONDITION OF COMMUNICATION SERVICE

(71) Applicant: SORACOM, INC., Tokyo (JP)

(72) Inventors: Naoki Mikuni, Tokyo (JP); Kazuki Nakanishi, Tokyo (JP)

(73) Assignee: SORACOM, INC., Tokyo (JP)

( * ) Notice: Subject to any disclaimer, the term of this patent is extended or adjusted under 35 U.S.C. 154(b) by 198 days.

(21) Appl. No.: 18/536,515

(22) Filed: Dec. 12, 2023

(65) Prior Publication Data

US 2024/0129713 A1 Apr. 18, 2024

Related U.S. Application Data

(63) Continuation of application No. PCT/JP2022/023890, filed on Jun. 15, 2022.

(30) Foreign Application Priority Data

Jun. 21, 2021 (JP) ................................ 2021-102487

(51) Int. Cl.
*H04W 8/20* (2009.01)
*H04L 43/045* (2022.01)
*H04L 43/0811* (2022.01)

(52) U.S. Cl.
CPC ............ *H04W 8/20* (2013.01); *H04L 43/045* (2013.01); *H04L 43/0811* (2013.01)

(58) Field of Classification Search
CPC ......... H04W 8/20; H04W 8/18; H04W 88/02; H04L 43/045; H04L 43/0811; H04M 11/00
See application file for complete search history.

(56) References Cited

U.S. PATENT DOCUMENTS 11,310,655 B2 4/2022 Tamagawa
2004/0058652 A1* 3/2004 McGregor ............ H04B 17/24 455/423
2018/0184281 A1 6/2018 Tamagawa
2022/0279339 A1 9/2022 Tamagawa

FOREIGN PATENT DOCUMENTS

JP 6097467 B1 3/2017
WO 2014/181485 A1 11/2014

* cited by examiner

*Primary Examiner* — Tonia L Dollinger
(74) *Attorney, Agent, or Firm* — WCF IP

(57) ABSTRACT

An apparatus receives, from a user terminal of a user using a SIM provided by a carrier having a communication infrastructure, a diagnosis request with respect to the SIM. In accordance with the diagnosis request, the apparatus, with respect to one or a plurality of instances included in the communication infrastructure, transmits an acquisition request for condition information concerning the condition of a wireless communication service associated with the SIM to be diagnosed. Each of the instances that have received the acquisition request acquires the condition information with respect to the SIM to be diagnosed, and transmits the condition information to the apparatus. The apparatus performs a diagnostic process on the basis of the received condition information, and transmits to the user terminal display information for a diagnostic result display screen based on the condition information.

19 Claims, 10 Drawing Sheets

700

| Time (UTC+09:00) | Event | IMEI | MCC | MNC | Country | Operator | Radio type | Area code | Cell ID |
|---|---|---|---|---|---|---|---|---|---|
| 2021/6/14 14:07 | Created | 351855000111122 | 440 | 25 | Japan | Operator2 | 3G or GSM | 65530 | |
| 2021/6/14 14:07 | Deleted | 351855000111122 | 440 | 25 | Japan | Operator2 | 3G or GSM | 65530 | |
| 2021/6/14 14:06 | Created | 351855000111122 | 440 | 25 | Japan | Operator2 | 3G or GSM | 65530 | |
| 2021/5/26 14:19 | Deleted | 351855000111122 | 440 | 15 | Japan | Operator1 | LTE | 4711 | 41404999 |
| 2021/5/26 14:15 | Created | 351855000111122 | 440 | 15 | Japan | Operator1 | LTE | 4711 | 41404999 |

FIG. 7

APPARATUS AND METHOD FOR DIAGNOSING CONDITION OF COMMUNICATION SERVICE

CROSS-REFERENCE TO RELATED APPLICATIONS

The present application is a continuation application of International Application number PCT/JP2022/23890, filed on Jun. 15, 2022, which claims priority under 35 U.S.C § 119(a) to Japanese Patent Application No. 2021-102487, filed on Jun. 21, 2021, contents of which are incorporated herein by reference in their entirety.

BACKGROUND OF THE INVENTION

The present disclosure relates to an apparatus, a method, and a program for diagnosing a condition of a communication service, and more particularly, to a method for diagnosing a condition of a communication service provided by an operator having a communication infrastructure on a cloud to be connected.

Wireless communication services are conventionally provided by Mobile Network Operators (MNOs), and users can start using the services by forming contracts with MNOs, receiving SIM cards from the MNOs, and attaching them to their devices.

In recent years, the sale of wireless communication lines has progressed due to the appearance of Mobile Virtual Network Operators (MVNOs), in which case the users receive the SIM cards from the MVNOs rather than the MNOs. The MVNOs can be broadly classified into i) those that do not have any communication infrastructure of their own and ii) those that have their own communication infrastructures and provide wireless communication services by connecting their communication infrastructures to communication infrastructures of the MNOs. As compared with the former, the latter (see FIG. 1) have their own communication infrastructures, and therefore, for example, they are able to set a price according to communication quality, such as a communication speed and a communication capacity, and attempt to meet various needs.

A move toward IoT, in which wireless communication functions are added to all kinds of objects to make them connected to the Internet, has significantly increased in recent years as a necessity for wireless communication services. Wireless devices that can be connected to a computer network including the Internet are referred to as "IoT devices" below.

The IoT devices include mobile terminals such as smartphones and tablets held by people, but they are also expanding to include devices that require a form of communication other than people, such as vehicles and other means of transport that move faster than people, and sensors that do not move from a specific position very often, and accordingly, functions required for the wireless communication services are diversified.

In order to provide a wide variety of functions, it is necessary for the MVNOs' communication infrastructures to perform additional processing in addition to the basic function of providing wireless communication lines, and the technology disclosed in Japanese Patent No. 6097467 by the applicant of the present disclosure enables implementation of such additional processing.

It should be noted that Mobile Virtual Network Enablers (MVNEs) that provide support services for the MVNOs to perform smooth business may intervene between the MNOs and the MVNOs, and the MVNEs may receive the SIM cards from the MNOs, which they then provide to the MVNOs. For example, it is conceivable that MVNEs' communication infrastructures could be connected to the MNOs' communication infrastructures to realize the wireless communication services, and the MVNOs, which do not have their own communication infrastructures, could take over retail.

However, the richer the functions provided to the users by the MVNOs or the MVNEs having their own communications infrastructures, the more difficult it is for users who are not familiar with communications technology to understand the details of a problem, when the problem arises where a desired communication cannot be performed, and make appropriate inquiries to help desks.

The MVNOs or the MVNEs may provide each user with a management screen that can be accessed over an IP network such as the Internet, allowing each of these users to change settings for SIM cards they are using to change the functions available using that SIM card. In such a case, the settings complicate conditions (condition) of the communication services and make it more difficult to understand the details of the problem when it arises.

BRIEF SUMMARY OF THE INVENTION

The present disclosure focuses on this point, and an object thereof is to visualize for users conditions of communication services provided by operators having communication infrastructures connected to MNOs' communication infrastructures.

It should be noted that the terms MNO, MVNO, and MVNE may differ in definition. In this specification, the MNOs have SGSN for 3G, S-GW for LTE as their communication infrastructures, and the MVNOs or the MVNEs are not distinguished therefrom, but may be generically referred to as the operators having communication infrastructures connected to the MNOs' communication infrastructures. Examples of the communication infrastructures owned by these operators include SGSN for 3G, S-GW for LTE.

Further, the above description uses an example of the SIM cards being attached to the IoT devices, but the present disclosure is not limited to physical SIM cards, and may be implemented by semiconductor chips incorporated in the IoT devices, software installed in secured areas within modules of the IoT devices, or the like, which will be referred to as "SIM" inclusively below. The SIMs store SIM identifiers for identifying the SIMs. Examples of SIM identifiers include IMSI, ICCID, MSISDN, and the like.

In order to achieve the above objectives, a first aspect of the present disclosure includes a method for diagnosing a condition of a communication service provided by an operator having a communication infrastructure on a cloud connected to a communication infrastructure of an MNO, the method including the steps of transmitting a request for acquiring condition information relating to the condition for at least one of one or more SIMs provided by the operator to a user of the communication service, to one or more instances included in the communication infrastructure of the operator, performing a diagnostic process on the basis of received condition information, and generating display information for displaying a result of a diagnosis including a result of the diagnostic process or an overview thereof.

Further, a second aspect of the present disclosure is an apparatus for diagnosing a status of a communication service provided by an operator having a communication infrastructure on a cloud connected to an MNO's communication infrastructure, the apparatus executing the steps of transmitting a request for acquiring condition information relating to the condition for at least one of the one or more SIMs provided by the operator to a user of the communication service, to one or more instances included in the communication infrastructure of the operator, performing a diagnostic process on the basis of received condition information, and generating display information for displaying a result of a diagnosis including a result of the diagnostic process or an outline thereof.

BRIEF DESCRIPTION OF THE DRAWINGS

FIG. 7 shows an example of a connection status according to the first embodiment of the present disclosure.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

First Embodiment

Figure 1:
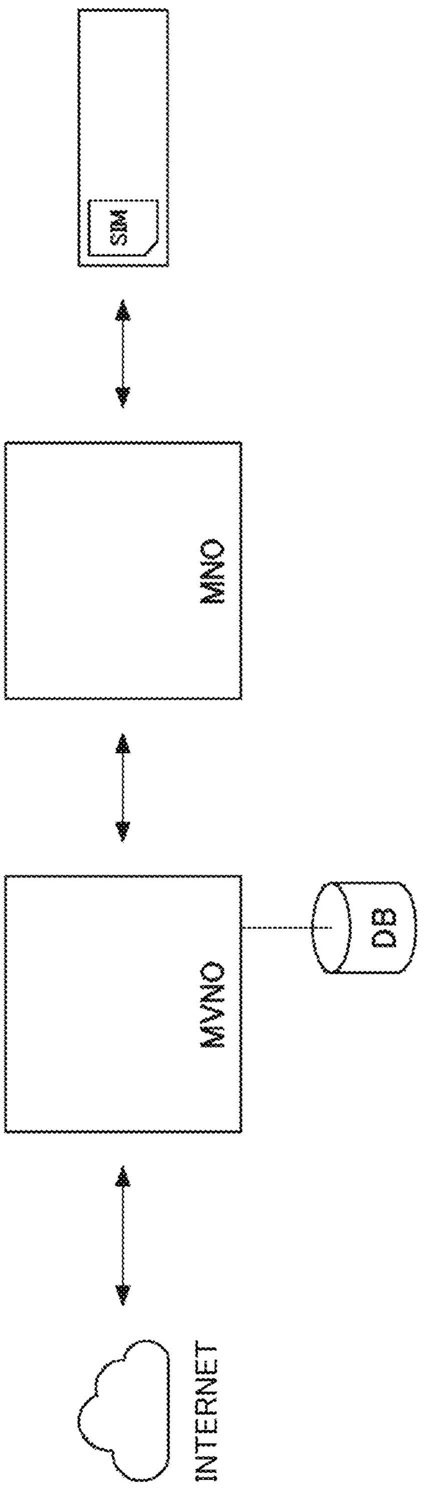
FIG. 1 schematically shows an MVNO that provides a wireless communication service by connecting its own communication infrastructure to an MNO's communication infrastructure.
Figure 2:
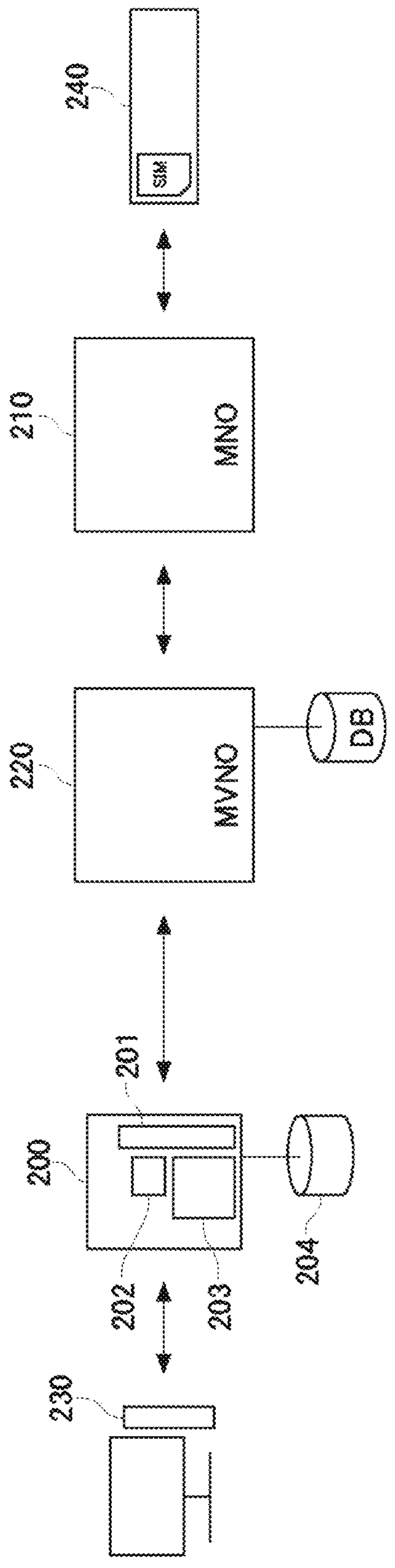
FIG. 2 shows an apparatus for diagnosing a condition of a wireless communication service according to a first embodiment of the present disclosure.

FIG. 2 shows an apparatus for diagnosing a condition of a wireless communication service according to a first embodiment of the present disclosure. An apparatus 200 is an apparatus for diagnosing a condition of a communication service provided by an operator having a communication infrastructure 220 that is connected to an MNO's communication infrastructure 210, and communicates with the communication infrastructure 220 over an IP network such as the Internet in order to acquire required data. Further, the apparatus 200 communicates with a user terminal 230 used by a user associated with one or more SIMs to be diagnosed over the IP network such as the Internet in order to allow a result of the diagnosis to be viewed. FIG. 2 shows one IoT device 240 with a SIM associated with that user, as an example.

The communication infrastructure 220 is shown as an MVNO's communication infrastructure in FIG. 2, but the communication infrastructure 220 may be an MVNE's communication infrastructure or any communication infrastructure as long as it is connected to the MNO's communication infrastructure 210. In addition, the communication infrastructure 220 may also be referred to as the MVNO's communication infrastructure below, but this is not intended to limit the communication infrastructure 220 to be only the one owned by the MVNO.

The apparatus 200 includes a communication part 201 such as a communication interface, a processing part 202 such as a processor or a CPU, and a storage 203 including a storage device or a storage medium such as a memory or a hard disk, and can be configured by executing a program for performing each process. The apparatus 200 may include one or more apparatuses, computers, or servers. Further, the program may include one or more programs, and may be recorded on a computer-readable storage medium to be a non-transitory program product. The program can be stored in a storage device or a storage medium such as i) the storage 203 or ii) a database 204 that the apparatus 200 can access via the IP network, and can be executed by the processing part 202. Data described below as being stored in the storage 203 may be stored in the database 204, and vice versa. The apparatus 200 may be one or more instances on the cloud.

The term "cloud" herein refers to a system capable of dynamically provisioning and delivering computing resources such as a CPU, a memory, a storage, and a network bandwidth on demand over a network. For example, the cloud can be used by utilizing AWS or the like. In addition, the term "public cloud" herein refers to a cloud that can be used by a plurality of tenants.

The communication infrastructure 220 includes i) a gateway that communicates with the MNO's communication infrastructure 210 via a GTP protocol and ii) one or more pieces of equipment for operating the gateway to run the wireless communication service and storing its history. These may each be one or more instances on the cloud or public cloud, and the communication infrastructure 220 has a plurality of instances on the cloud or public cloud.

The MVNO's communication infrastructure 220 stores a history of the wireless communication service, used by the IoT device 240 by using its SIM. For example, time of creating a session, time of deleting a session, a device identifier such as IMEI, and the like are stored in association with the SIM identifier. Further, an interval between the time of creating the session and the time of deleting the session may be calculated as a duration of the session and stored in association with the SIM identifier. In the following, information on the session for each SIM is also referred to as "session information." The session information may include information on one or more session events, and examples of the session event include creation and deletion of sessions and the like.

Furthermore, the MVNO's communication infrastructure 220 stores a time of communication occurrence, communication traffic, and the like in association with the SIM identifier. In the following, the information on post-connection communication for each SIM is also referred to as "communication information," which may partially overlap with the session information.

Moreover, the MVNO's communication infrastructure 220 can also store a status of usage (usage status) of the SIM such as ready, in use (active), inactive, waiting for start being used (standby), suspended and terminated in association with the SIM identifier. The usage status of the SIM may include a device restriction setting for restricting a device that can use the SIM to a device identified by a previously determined device identifier. This is a so-called IMEI lock.

The MNO's communication infrastructure 210 stores, for example, contract contents such as a communication quality of the SIM issued by the MNO or a contractual plan indicating the contract contents, in association with the SIM identifier. Further, the MNO's communication infrastructure 210 may store location information of the SIM in association with the SIM identifier. This location information can be information that indirectly indicates a location of the SIM, such as an identifier for identifying a base station being connected to, and includes, for example, at least one of a country code such as MCC, a network code such as MNC, an area code such as LAC or TAC, or a cell ID such as CID or ECID. If a subscriber management database such as HLR/HSS is included in the communication infrastructure 220, the operator having the communication infrastructure 220 can issue the SIM. In this case, the data described here as being stored in the MNO's communication infrastructure 210 is stored in the MVNO's communication infrastructure 220. In the following, the information on the SIM is also referred to as "SIM information" including the usage status, the contract contents, the location information, and the like of the SIM.

The IoT device 240 may store the location information of the SIM in addition to the SIM identifier. This location information may be the same information as at least some of the location information of the SIM stored in the MNO's communication infrastructure 210 or the MVNO's communication infrastructure 220 described above. Further, the IoT device 240 may store a device identifier, remaining battery power, a radio wave intensity, a base station identifier for identifying a connectable base station, and the like, or may acquire and store these pieces of information on request. In the following, these pieces of information, which are information on the IoT device that uses the SIM and is independent of this SIM, are also referred to as "IoT device information." The term "radio wave intensity" here represents intensity of radio waves received from the base station by using an antenna included in a device such as RSSI. The term "base station identifier" is, as an example, one of or a combination consisting of a country code such as MCC, a network code such as MNC, an area code such as LAC or TAC, or a cell ID such as CID or ECID, the country code, the network code, the area code, and the cell ID for identifying one or more base stations that can be connected to.

Figure 3:
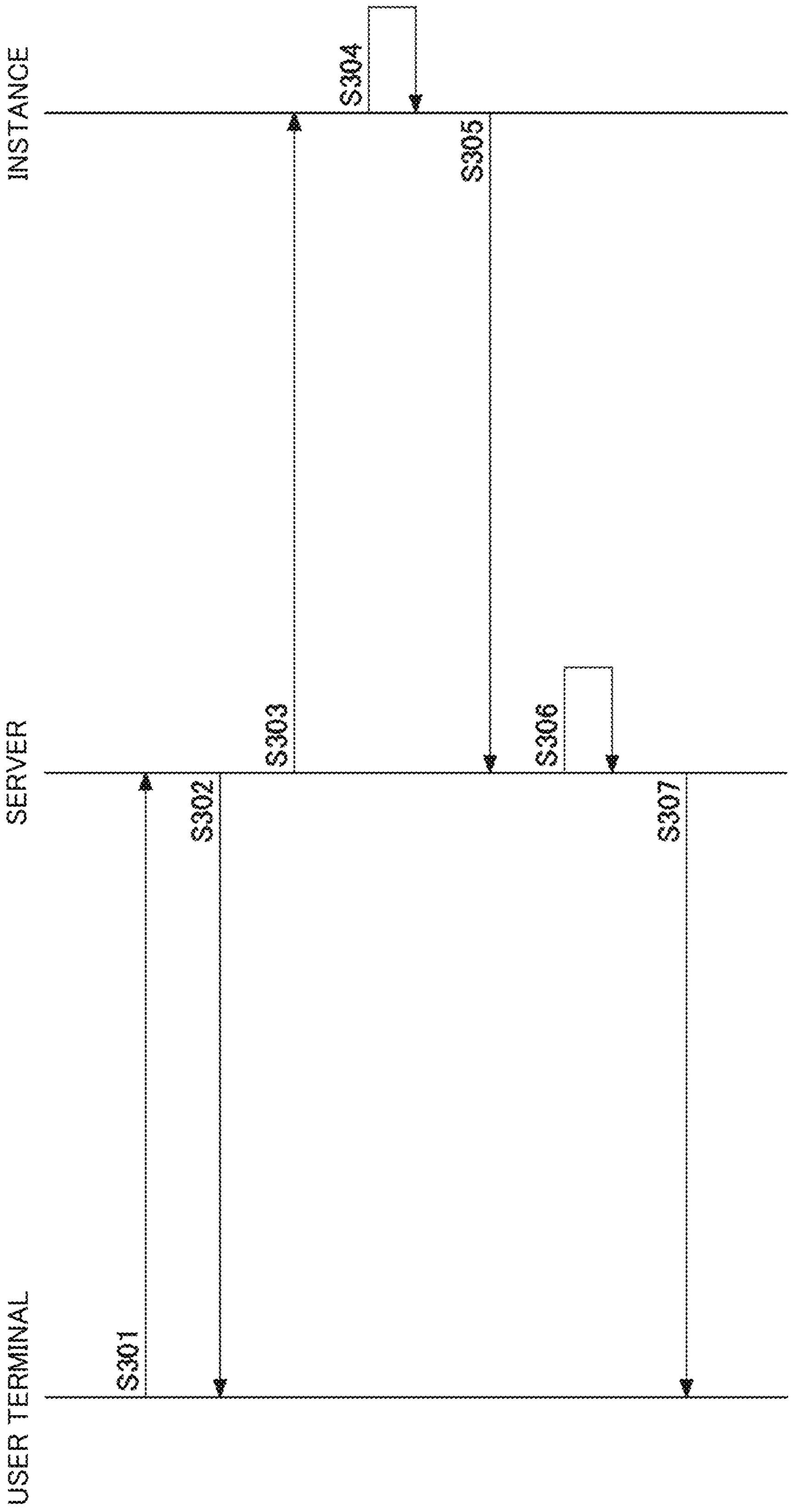
FIG. 3 shows a process of a method for diagnosing the condition of the wireless communication service according to the first embodiment of the present disclosure.

FIG. 3 shows a process of a method for diagnosing the condition of the wireless communication service according to the first embodiment of the present disclosure. First, the apparatus 200 receives, from the user terminal 230 of the user who uses one or more SIMs provided by the operator having the communication infrastructure 220, a request for diagnosis of at least any of the above one or more SIMs (S301). The request for diagnosis includes, in one example, i) one or more SIM identifiers for identifying the one or more SIMs to be diagnosed and ii) a diagnosis period. If no specific SIM identifier is included, the apparatus 200 may determine one or more SIMs associated with the user as a SIM identifier to be diagnosed, and similarly, the apparatus 200 may determine any period of time as the diagnosis period if no diagnosis period is included.

Figure 4:
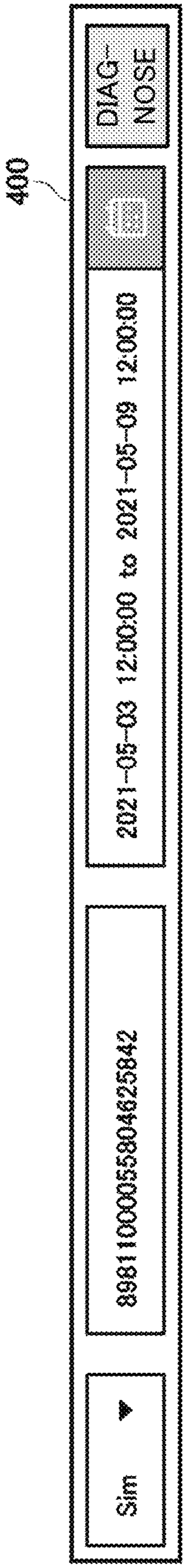
FIG. 4 shows an example of an input screen for diagnosis request information according to the first embodiment of the present disclosure.

FIG. 4 shows an example of an input screen for diagnosis request information according to the first embodiment of the present disclosure. The ICCID "89811000055804625842" is inputted as the SIM identifier, and a period of time from 12:00 on May 3, 2021 to 12:00 on May 9, 2021 is inputted as the diagnosis period.

The apparatus 200 transmits an acceptance notification to the user terminal 230 notifying that the request for diagnosis has been accepted (S302). Since it may take 10 seconds or longer to complete the diagnosis depending on the nature of the diagnosis, it is preferable to notify the user that the request for diagnosis has been accepted, but it is also possible to directly reply display information for displaying the result of the diagnosis, as will be described later, without notifying about the acceptance. Although not described with the request for diagnosis above, there are various types of diagnoses that can be performed as described below, and the request for diagnosis may include diagnosis contents. When a problem arises where a desired communication cannot be performed, a waiting time can be reduced by allowing the user to designate the diagnosis contents necessary for the user. The acceptance notification is transmitted by communication over the IP network, and more specifically, the acceptance notification can be transmitted by an HTTP response in response to an HTTP request from the user terminal 230.

Next, in response to the request for diagnosis, the apparatus 200 transmits, to the one or more instances included in the communication infrastructure 220, a request for acquiring condition information on the condition of the wireless communication service related to the one or more SIMs to be diagnosed (S303). The request for acquisition may, as an example, be transmitted directly or indirectly from the apparatus 200 to each instance. The request for acquisition is transmitted by communication over the IP network, and more specifically, it can be transmitted as the HTTP request.

Each instance that receives the request for acquisition acquires predetermined condition information on the one or more SIMs to be diagnosed (S304) and transmits it to the apparatus 200 (S305). The condition information includes the session information, the communication information, and the SIM information. If the condition information has been already stored, the instance that received the request for acquisition can quickly transmit the condition information to the apparatus 200, but for example, the instance that received the request for acquisition may take several seconds or several tens of seconds to acquire the IoT device information, such as the latest radio wave intensity and the base station identifier, that can be acquired by making a further request to the IoT device 240. AT commands for modem control can be used for this request to the IoT device 240, for example.

There are cases where, depending on the type of condition information, the condition information regarding a specific diagnosis period cannot be acquired. In such a case, the instance that received the request for acquisition may acquire information other than the diagnostic period, such as current information, as the condition information of this type.

The information on the operation of the wireless communication service provided by using the communication infrastructure 220 could be stored in the equipment included in the communication infrastructure 220 and available to be acquired as the condition information, but this information is preferably stored on a server (not shown in figures) external to the communication infrastructure 220, in order to be able to provide such information to users if a failure occurs in the communication infrastructure 220. The apparatus 200 may acquire the information on the operation of the wireless communication service from such a server as the condition information.

The apparatus 200 performs a diagnostic process on the basis of the received condition information (S306). It is conceivable that the diagnostic process could, as an example, detect a period of time within the diagnosis period when the SIM is in a status other than a predetermined status as a problem related to the usage status. Further, it is conceivable that the diagnosis could be made by inferring whether or not there is a problem related to the SIM usage status in the diagnostic period on the basis of the SIM information contained in the condition information, regardless of whether it is the diagnosis period or not. Further, another example is a detection of a problem related to the connection status or the communication status in the diagnosis period. More specifically, problems with the connection status may be a problem that there is no creation or deletion of the session for a predetermined number of times or more within the diagnosis period, or a problem that there is a session that deviates from the average value of a distribution of session duration time within the diagnosis period by a predetermined value or more. The value of the predetermined number of times can be determined for each session event, and for example, it could be once for each session event. As an example, if there is at least one of a session creation or a session deletion once or more within the diagnosis period, the connection status is diagnosed as normal. As another example, if the previous session is created before the start date and time of the diagnosis period and also the previous session is deleted after the end date and time of the diagnosis period, the connection status is diagnosed as normal. As yet another example, if the creation date and time of the current session is before the start date and time of the diagnosis period, there is a session within the diagnosis period and the connection status is diagnosed as normal. The predetermined value may be a standard deviation of the distribution or a value obtained by multiplying said standard deviation by a constant. Further, the distribution of the session duration may be based not only on the sessions in the diagnostic period, but also on a session within a predetermined period of time using the SIM to be diagnosed. For example, if short session durations continue successively, it means that the session is repeatedly created and deleted, which allows an inference that the user is in an area of poor reception condition during that period of time. It is conceivable that at least some of the IoT device information, such as the radio wave intensity, could also be used in the diagnostic process, in addition to the session information. More specifically, problems regarding the connection status may be a problem that data communication has not occurred at least a predetermined number of times, or a problem that the communication traffic exceeded a predetermined value, within the diagnosis period. If the data communication occurred at least a predetermined number of times within the diagnosis period, it can be said that there was a session for communication, and therefore, the connection status can be diagnosed as normal.

Although a case of diagnosing the presence or absence of a problem related to the usage status, the connection status, and the communication status has been described here, there may also be cases of diagnosing the presence or absence of a problem related to a status other than these. The diagnosis for each status can be made by having diagnosis criteria stored in the storage 203 and referring to the diagnosis criteria on the basis of the acquired condition information. The diagnosis criteria may be a code that defines a diagnostic algorithm and includes, as an example, a code generated by machine learning.

As an example, if it is determined that there is a failure in the wireless communication service and a problem with an operational status on the basis of the operational information, the problem relating to the operational status can be highlighted even if other status is determined to have a problem at the time of day or time period at which the problem occurred. Not displaying any problems other than those related to the operational status is also an example of highlighting the problem related to the operational status. More generally, the diagnostic process can be performed on the basis of at least one of the condition information and the operational information.

As another example, if the location of the SIM is at a predetermined distance or more away within a predetermined period on the basis of the location information, the SIM may have been stolen and it can be determined that there is a problem related to a location status. The possibility of theft can also be determined on the basis of the SIM's device restriction settings, depending on whether or not the IoT device 240 is a device authorized in advance.

Figure 5:
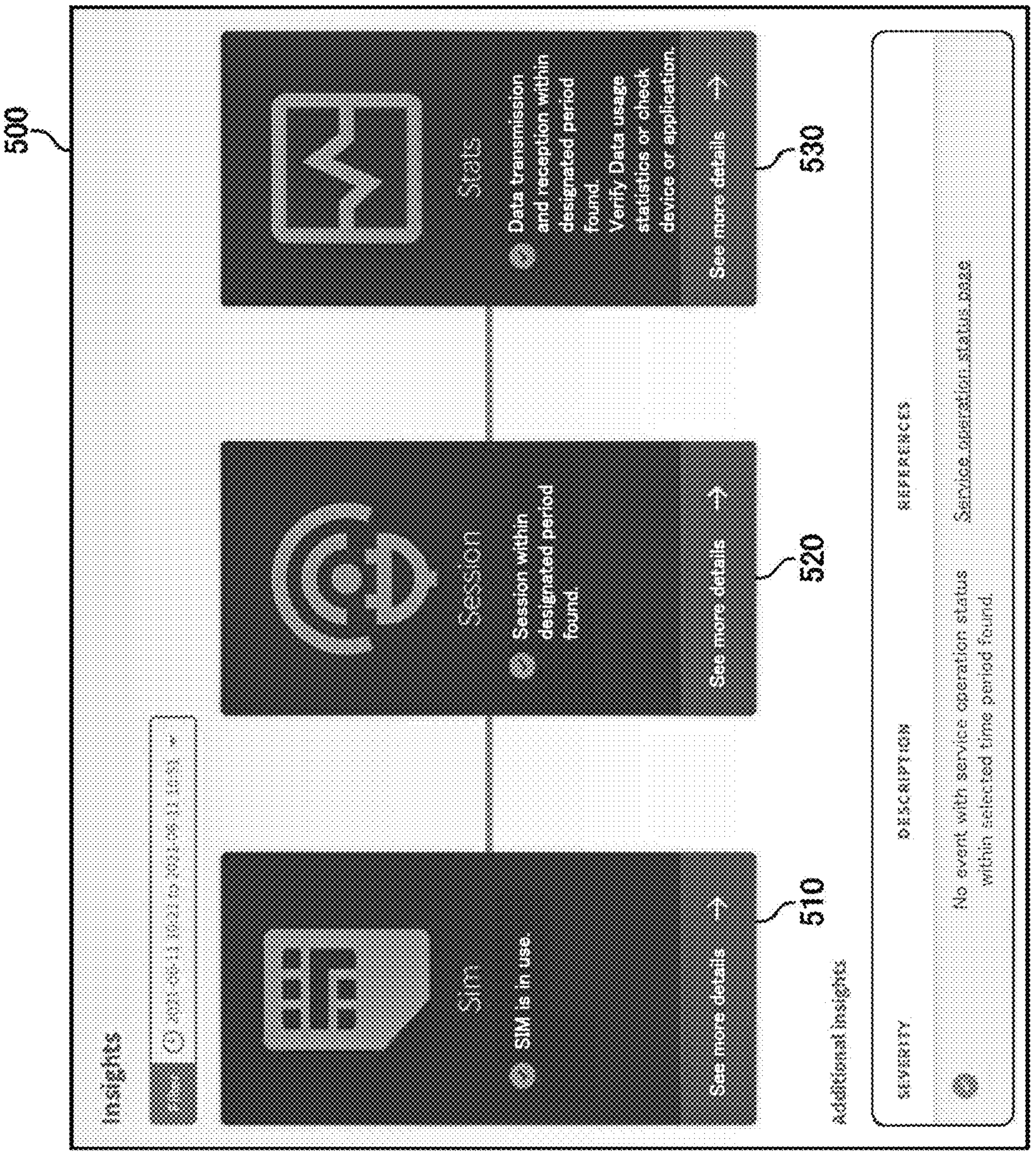
FIG. 5 shows an example of a diagnostic result display screen according to the first embodiment of the present disclosure.

Then, the apparatus 200 transmits, to the user terminal 230, display information for a diagnostic result display screen that is based on said condition information (S307). FIG. 5 shows an example of the diagnostic result display screen according to the first embodiment of the present disclosure. It is an example of the user terminal 230 displaying a diagnostic result display screen 500 on a web browser, and the display information may be HTML data. In this example, a SIM usage status overview 510, a connection status overview 520, and a communication status overview 530 are displayed as the results of the diagnoses, on the diagnostic result display screen 500. As shown in the figure, these statuses can be arranged and displayed in a straight line to make it easier to understand where the problem lies. The overviews of the results of the diagnoses of the usage status of the SIM, the connection status, and the communication status are shown in FIG. 5 as a list, but the results of the diagnoses or the overviews thereof may be listed for at least two or more of a plurality of statuses included in the results of the diagnoses.

The usage status overview 510 is based on the SIM information included in the condition information, and in the example shown in the figure, it is shown as an overview that no particular problem was detected in the diagnosis period, and the current condition is in use.

Figure 6:
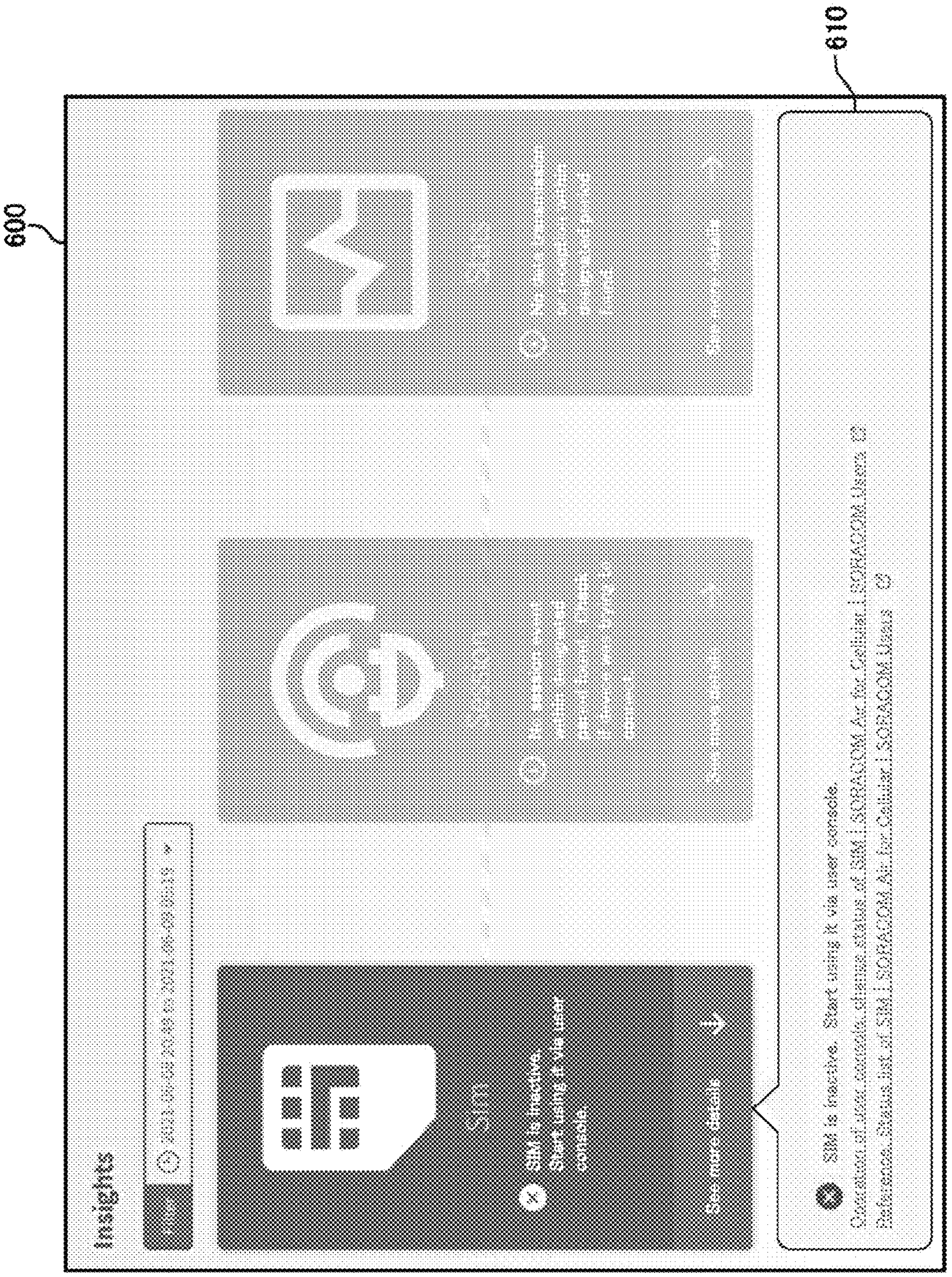
FIG. 6 shows a result of a diagnosis of a usage status according to the first embodiment of the present disclosure.

FIG. 6 shows an example of the diagnostic result display screen when the current usage status is inactive. In this way, each status can be displayed with different visual representations, such as different colors, depending on the result of the diagnostic process, to make it easier to understand where the problem lies. In this example, it is shown that there is a problem with the current usage status, but if no problem had been detected within the diagnosis period, it could be shown that no problem has been detected, without considering the current usage status.

Figure 8:
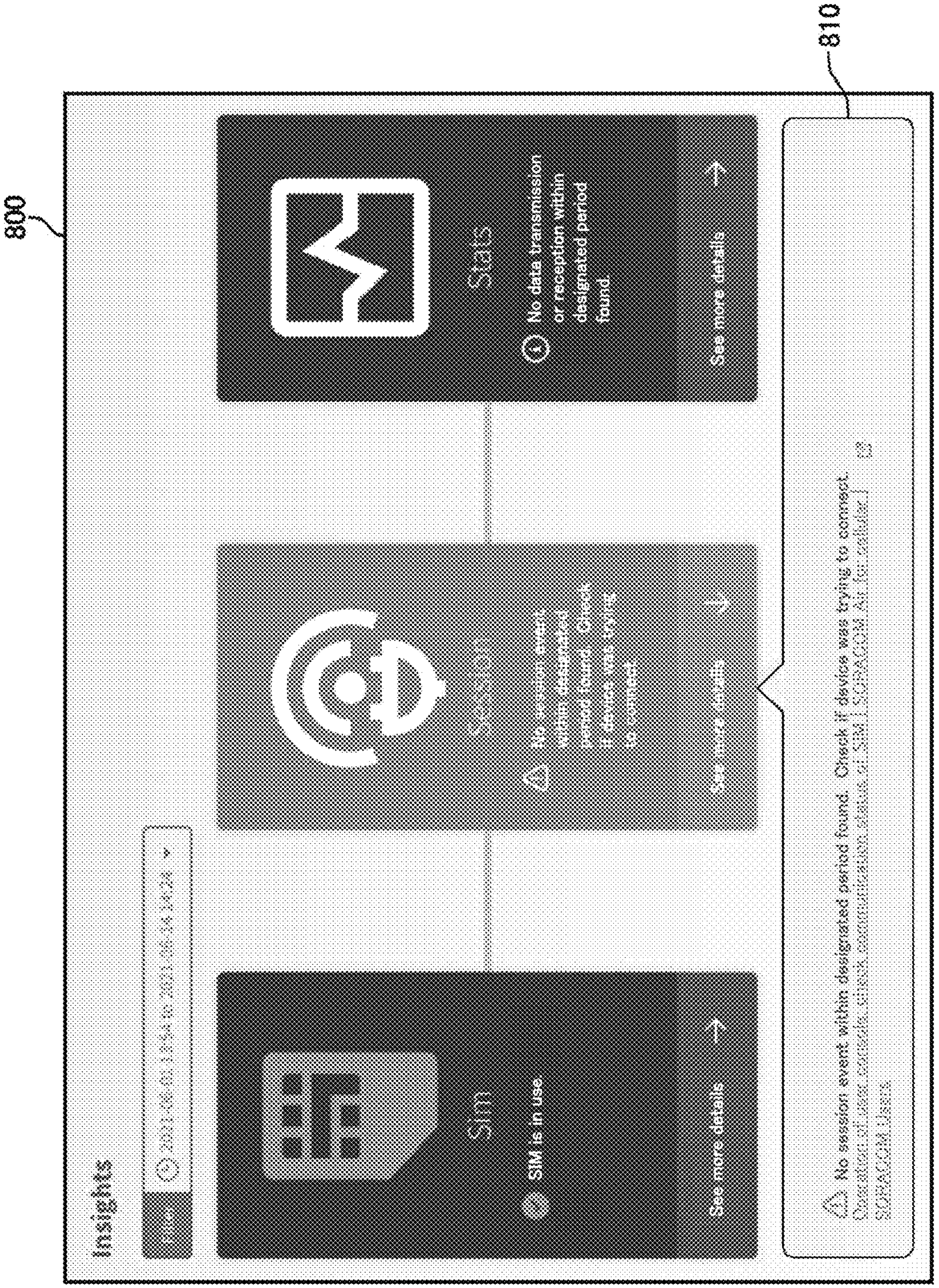
FIG. 8 shows a result of a diagnosis of the connection status according to the first embodiment of the present disclosure.

The user can cause connection status details 700 based on the session information to be displayed as shown in FIG. 7 by clicking or tapping to select the connection status overview 520 displayed on the user terminal 230. Here, there is shown a state where an IoT device, whose device identifier IMEI is "351855000111122," creates and deletes a session for LTE connection with the MNO represented by "Operator 1" on May 26, and then newly creates a session after creating and deleting a session for 3G connection with the MNO represented by "Operator 2" on June 14. Some of the various numbers are different from the actual numbers. No particular problem is detected in the connection status in the example shown in FIG. 7, but if a problem is detected, a session event related to the problem may be displayed by different visual representations, such as different colors. The fact that a problem has been detected may be displayed in the connection status overview 520 in FIG. 5. FIG. 8 shows an example of the connection status overview 520 displaying that the problem relating to the connection status was detected due to the absence of the session creation or deletion within the diagnosis period.

Figure 9:
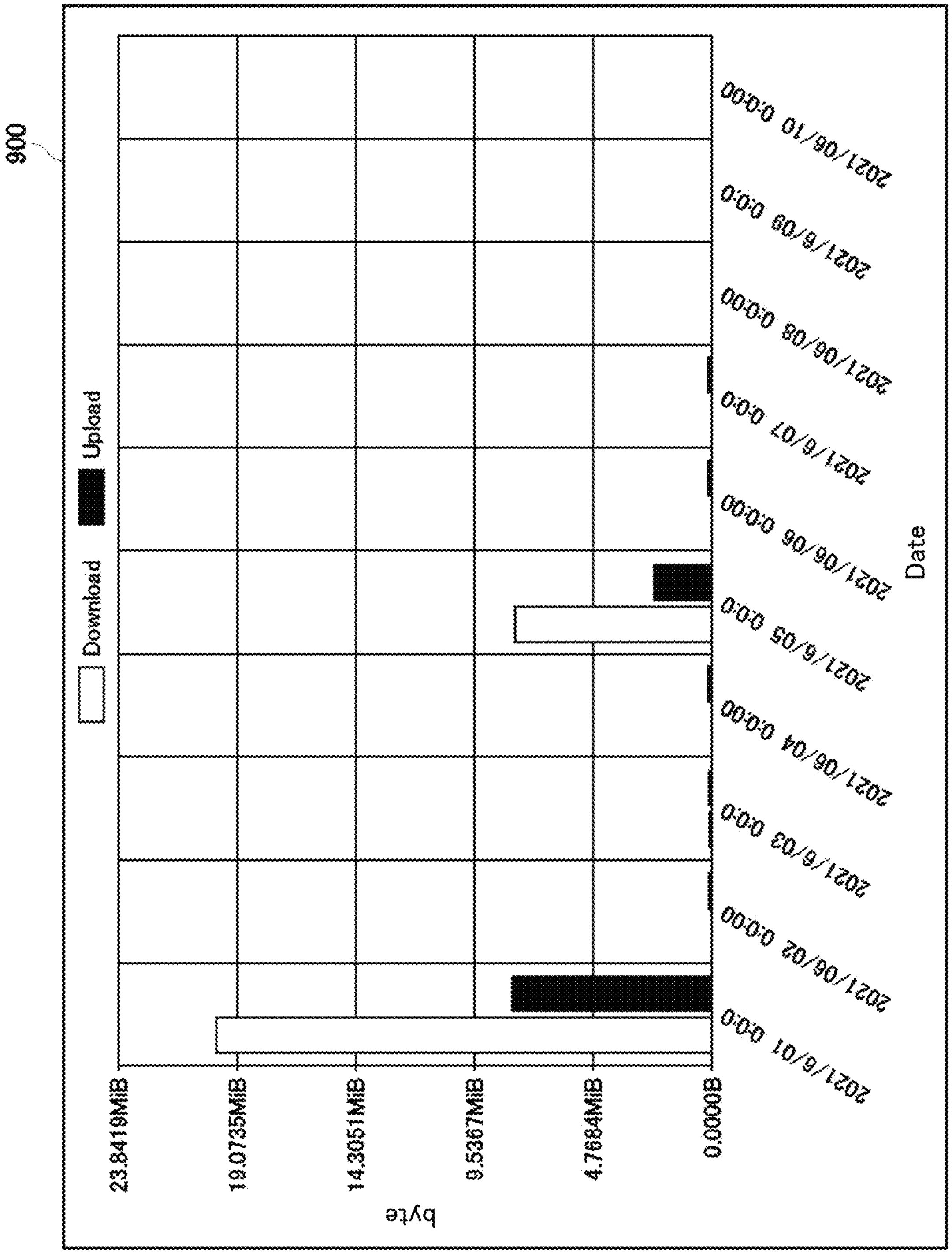
FIG. 9 shows an example of a communication status according to the first embodiment of the present disclosure.

The user can cause communication status details 900 based on the communication information to be displayed as shown in FIG. 9 by clicking or tapping to select the communication status overview 530 displayed on the user terminal 230. Although the example of FIG. 9 shows that no particular problem was detected in the communication status, the time of day or time period related to the problem or the communication traffic at that time of day or time period may be displayed by different visual representations, such as different colors, if a problem had been detected. The fact that a problem has been detected may be displayed in the communication status overview 530 in FIG. 5.

If there is a problem, reference information for solving the problem may be displayed as shown in FIGS. 6 and 8. The reference information may include a link to a web site describing contents relevant to the problem. In addition, it may also display causal information on the configuration or logs that may have caused the problem.

As described above, according to an example of the present embodiment, it is possible for the user to visualize the condition of the communication service provided by the operator having the communication infrastructure on the cloud connected to the MNO's communication infrastructure, by having the condition information on the condition acquired and diagnosed and having the result of the diagnosis or the overview thereof for each status such as the usage status of the SIM, the connection status, and the communication status or the overview thereof listed on the terminal used by the user for at least two or more statuses.

It should be noted that an example of displaying the overview and the details of the result of the diagnosis of each status on separate screens has been described, but these may be displayed on the same screen. Further, when the detail screen and the overview screen are separate from each other, a tab may be provided on the overview screen for displaying the detail screen for each status, and the detail screen associated with the tab may be displayed in response to the tab being clicked or tapped.

Furthermore, in the above description, the apparatus 200 performs the diagnostic process in response to receiving the request for diagnosis, but it may perform the diagnostic process periodically for each unit, for example, a SIM unit, a set of SIM units, a user unit, or the like and make a notification if a problem is detected, even without the request for diagnosis from the user.

In addition, although a case where the result of the diagnosis is displayed on the web browser on the user terminal 230 as the diagnostic result display screen 500 in the above description was described, the display information may be generated in PDF format, image format, or another viewable file format other than HTML format. The generated display information may be transmitted by the apparatus 200 to the user terminal 230 after generation, or may be stored in the storage 203 of the apparatus 200 after generation and transmitted in response to a request for download from the user terminal 230.

Second Embodiment

In the first embodiment, a case where the user transmits the request for diagnosis to the apparatus 200 from the user terminal 230 was mainly described as an example, but in view of the fact that the condition of the communication service can be visualized for the user, thereby facilitating, for example, an inquiry to the help desk when a problem arises where a desired communication cannot be performed, it is conceivable to perform the diagnostic process for the one or more SIMs associated with the user in response to the inquiry made to the help desk. This allows the users to understand the details of the problem and solve the problem themselves before they get a response from the help desk, or to thoroughly understand the response from the help desk.

Figure 10:
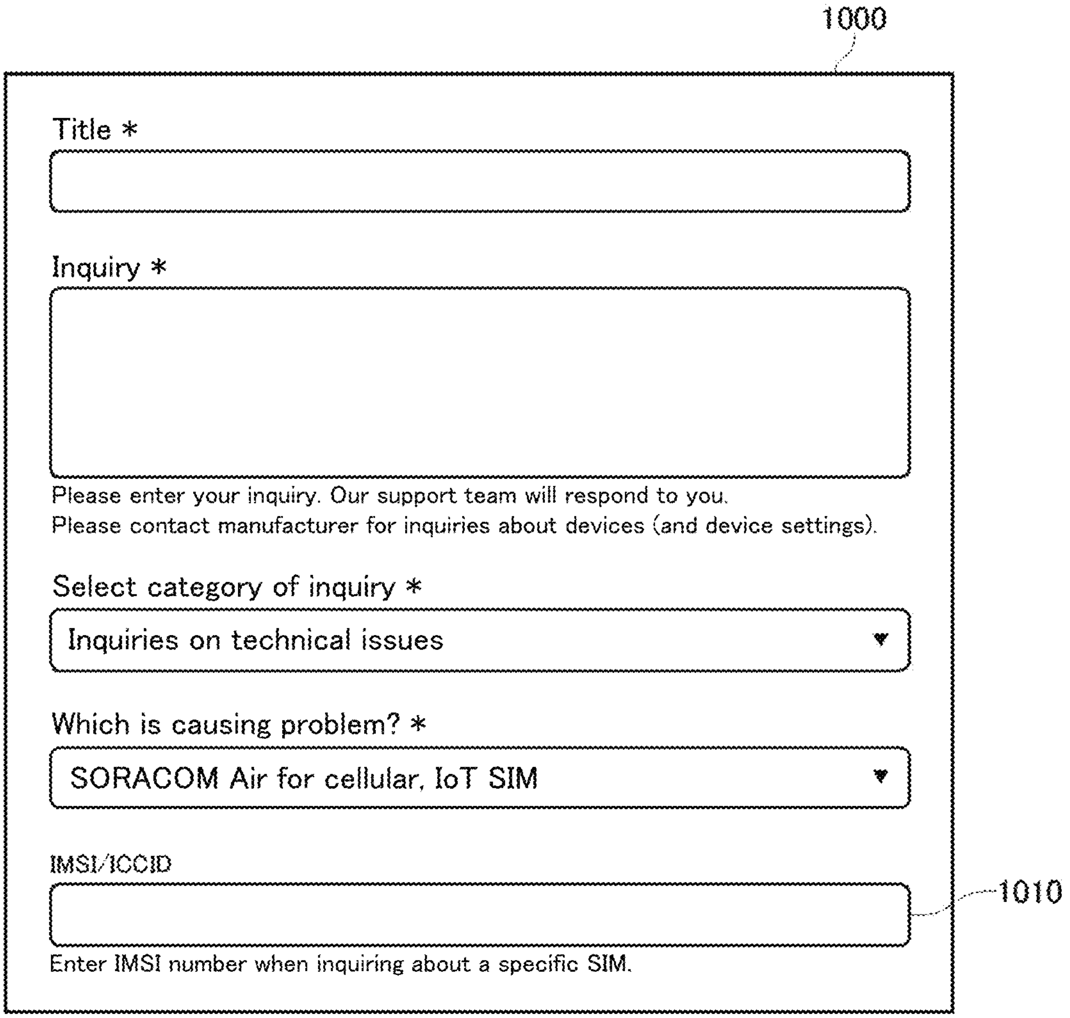
FIG. 10 shows an example of a screen for making an inquiry to a help desk according to a second embodiment of the present disclosure.

FIG. 10 shows an example of a screen for making an inquiry to the help desk according to a second embodiment of the present disclosure. An inquiry screen 1000 includes an input field 1010 for SIM identifiers such as IMSI and ICCID in addition to input fields for contents of the inquiry and the like.

What is claimed is:

1. A method for diagnosing a condition of a communication service, performed by an apparatus of an operator having a communication infrastructure on a cloud connected to a communication infrastructure of a mobile network operator (an MNO), wherein the operator has the communication infrastructure of a mobile virtual network operator (MVNO) or a mobile virtual network enabler (MVNE), the method comprising the steps of:

the apparatus transmitting a request for acquiring condition information relating to the condition for at least one of one or more subscriber identity modules (SIMs) provided by the operator to a user of the communication service, to one or more instances included in the communication infrastructure of the operator, the condition information including at least one of SIM information, session information, communication information, or IoT device information;

the apparatus performing a diagnostic process of the communication service on the basis of received condition information; and the apparatus generating display information for displaying a result of a diagnosis including a result of the diagnostic process or an overview thereof.

2. The method according to claim 1, further comprising the step of:

transmitting an acceptance notification for notifying the user terminal that the request for diagnosis was accepted.

3. The method according to claim 1, wherein the diagnostic process includes diagnosing the presence or absence of a problem relating to a connection status in a diagnosis period on the basis of session information included in the condition information.

4. The method according to claim 1, wherein the diagnostic process includes diagnosing the presence or absence of a problem relating to a connection status in a diagnosis period on the basis of i) session information included in the condition information and ii) radio wave intensity which is a part of IoT device information included in the condition information.

5. The method according to claim 1, wherein the diagnostic process includes diagnosing the presence or absence of a problem relating to a communication status in a diagnosis period on the basis of communication information included in the condition information.

6. The method according to claim 1, further comprising the step of: transmitting, to a server not included in a communication infrastructure of the operator, a request for acquiring operational information relating to a communication infrastructure of the operator.

7. The method according to claim 6, wherein the diagnostic process is performed on the basis of the condition information and the operational information.

8. The method according to claim 6, wherein if it is determined that there is a failure in an operational status of a wireless communication service on the basis of the operational information, the generating display information highlights the problem relating to the operational status even if other status is determined to have a problem at a time of day at which the problem occurred.

9. The method according to claim 8, wherein if it is determined that there is a failure in an operational status of a wireless communication service on the basis of the operational information, the generating display information does not display any problems other than the problem relating to the operational status even if other status is determined to have a problem at a time of day at which the problem occurred.

10. The method according to claim 1, wherein the performing a diagnostic process diagnoses that a connection status of the communication service has a problem if no session is created or deleted more than a predetermined number of times within the diagnostic period.

11. The method according to claim 1, wherein the performing a diagnostic process diagnoses that a connection status of the communication service has a problem if there is a session that deviates from the average value of a distribution of session duration within a diagnosis period by a predetermined value or more.

12. The method according to claim 1, wherein the performing a diagnostic process diagnoses a poor reception condition of the communication service if session duration of a predetermined time period or shorter continues successively.

13. The method according to claim 1, wherein the result of the diagnosis includes a plurality of statuses indicating the condition.

14. The method according to claim 8, wherein the display information displays each of the plurality of statuses in different visual representations depending on a result of the diagnostic process.

15. The method according to claim 8, wherein the display information causes the plurality of statuses to be arranged and displayed in a straight line.

16. An apparatus for diagnosing a status of a communication service of an operator having a communication infrastructure on a cloud connected to a communication infrastructure of an MNO, wherein the operator has the communication infrastructure of an MVNO or an MVNE, the apparatus executing the steps of:

transmitting a request for acquiring condition information relating to the condition for at least one of the one or more SIMs provided by the operator to a user of the communication service, to one or more instances included in the communication infrastructure of the operator, the condition information including at least one of SIM information, session information, communication information, or IoT device information;

performing a diagnostic process of the communication service on the basis of received condition information; and generating display information for displaying a result of a diagnosis including a result of the diagnostic process or an outline thereof.

17. The method according to claim 1, further comprising the step of: transmitting the display information to the user.

18. The method according to claim 1, wherein the request for acquisition is transmitted in response to (i) a request for diagnosis of the at least one of the one or more SIMs is received from a user terminal of a user using the one or more SIMs or (ii) an inquiry to a help desk of the communication service.

19. The method according to claim 1, wherein the apparatus transmits the request for acquisition to the one or more instances, in response to receiving a request for diagnosis of the at least one of the one or more SIMs from a user terminal of a user using the one or more SIMs, and transmits the display information to the user terminal.

* * * * *